US007515979B2

(12) United States Patent
Shimizu et al.

(10) Patent No.: US 7,515,979 B2
(45) Date of Patent: Apr. 7, 2009

(54) AUTOMIX SYSTEM

(75) Inventors: Masahiro Shimizu, Hamamatsu (JP); Naoki Tomizawa, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 989 days.

(21) Appl. No.: 10/885,931

(22) Filed: Jul. 6, 2004

(65) Prior Publication Data

US 2005/0009546 A1 Jan. 13, 2005

(30) Foreign Application Priority Data

Jul. 10, 2003 (JP) .............................. 2003-195012

(51) Int. Cl.
*G06F 17/00* (2006.01)

(52) U.S. Cl. .......................... 700/94; 381/119; 715/716

(58) Field of Classification Search .................... 700/94
See application file for complete search history.

(56) References Cited

U.S. PATENT DOCUMENTS

| | | | | |
|---|---|---|---|---|
| 4,748,608 | A * | 5/1988 | Matsumoto et al. | 369/43 |
| 5,036,508 | A * | 7/1991 | Okano | 369/47.48 |
| 5,845,152 | A | 12/1998 | Anderson et al. | |
| 5,982,828 | A | 11/1999 | Fujimori et al. | |
| 6,061,458 | A * | 5/2000 | East et al. | 381/119 |
| 6,239,346 | B1 | 5/2001 | Goto et al. | |
| 6,438,080 | B1 * | 8/2002 | Shoji et al. | 369/47.28 |
| 6,947,365 | B2 * | 9/2005 | Lai et al. | 369/59.2 |
| 7,006,642 | B1 * | 2/2006 | Kumai | 381/119 |
| 7,181,298 | B1 * | 2/2007 | Yoshio et al. | 700/94 |
| 7,191,023 | B2 * | 3/2007 | Williams | 700/94 |
| 7,236,836 | B1 * | 6/2007 | Tanaka et al. | 700/94 |
| 7,242,990 | B2 * | 7/2007 | Suyama et al. | 700/94 |
| 7,260,226 | B1 * | 8/2007 | Miura et al. | 381/56 |
| 7,356,245 | B2 * | 4/2008 | Belknap et al. | 386/75 |
| 2002/0082732 | A1 * | 6/2002 | Suyama et al. | 700/94 |
| 2002/0193893 | A1 * | 12/2002 | Li et al. | 700/94 |
| 2004/0049304 | A1 * | 3/2004 | Chen | 700/94 |
| 2004/0199276 | A1 * | 10/2004 | Poon | 700/94 |
| 2004/0240348 | A1 * | 12/2004 | Mitsuda | 369/47.28 |
| 2004/0254660 | A1 * | 12/2004 | Seefeldt | 700/94 |
| 2005/0009546 | A1 * | 1/2005 | Shimizu et al. | 455/502 |
| 2005/0025320 | A1 * | 2/2005 | Barry | 381/119 |
| 2005/0234571 | A1 * | 10/2005 | Holmes | 700/94 |

OTHER PUBLICATIONS

Yamaha DME32E manual, copyright 2000.*

* cited by examiner

*Primary Examiner*—Curtis Kuntz
*Assistant Examiner*—Paul McCord
(74) *Attorney, Agent, or Firm*—Morrison & Foerster LLP

(57) ABSTRACT

In an automix system of network type, one of control equipment and audio equipment transmits time information data to the network, and the other of the control equipment and the audio equipment receives the time information data to thereby synchronize times with each other between the control equipment and the audio equipment. The audio equipment obtains time information when an operation device is manipulated based on the time information data received from the network and provides an operation event with that time information as a time stamp. The operation event provided with the time stamp is transmitted from the audio equipment to the control equipment via the network. This enables the control equipment to record the operation event with no time lag between the audio equipment and the control equipment.

19 Claims, 8 Drawing Sheets

AUTOMIX SYSTEM

BACKGROUND OF THE INVENTION

1. Technical Field of the Invention

The present invention relates to an automix system for conducting automix between control equipment and audio equipment through a network.

2. Prior Art

Conventionally, a sequencer is connected to a mixer or an effector in an automix system. A user may manipulate an operation device such as a fader provided on the mixer or the effector along with progression of music provided from the sequencer. The operation amount of the operation device can be recorded in a memory every moment. This recording function of the operation event is known as automix. The automix function can be used as follows. For example, the automix is turned on when song A is arranged. While the sequencer reproduces song A, a user operates the fader along with the progress of song A. The memory is controlled to successively record operation events together with time stamps indicating the times when the fader is operated. The recorded operation events are read out together with the time stamps for reproduction of arranged song A. When the sequencer reproduces the automixed song A, the fader is automatically operated in accordance with the timings indicated by the time stamps.

When sequencer software is installed and executed on a personal computer (PC), the PC can be operated as a sequencer. When the PC and a mixer or the like are networked for automixing, communication takes place between the PC and the mixer or the like based on a communication standard used for the network. In this case, the mixer or the like is configured to transmit operation event data according to the communication standard. When receiving the operation event data, the PC applies the receiving time of the operation event data as a time stamp for recording. Consequently, a time lag occurs between the time stamp and the actual timing when the operation event occurred. The delay is equivalent to the time spent for the transmission process by the mixer or the like. The network is used for connecting audio equipment such as a plurality of mixers, effectors, and the like with control equipment such as a PC and sequencer. These equipments operate according to their own internal clock and are not synchronized with each other. For these reasons, in reproduction of the song, there is caused a problem that the operation events automixed with the song are reproduced at times deviated from the progression of the song reproduction.

SUMMARY OF THE INVENTION

It is therefore an object of the present invention to provide an automix system capable of synchronizing times between a plurality of audio equipments and a control equipment and capable of recording operation events for automix without causing a time lag.

In order to achieve the above-mentioned object, an inventive automix system comprises a plurality of equipments connected to each other through a network, and including an audio equipment and a control equipment capable of recording operation events for effecting automix of audios. One of the plurality of the equipments uses its own time counter to count time and transmits time information data indicative of the counted time to the network at a specified cycle. Other equipment uses its own time counter for counting time, receives the time information data through the network, and corrects the counted time based on the received time information data, thereby synchronizing the time counted by each time counter of each equipment connected to the network. The audio equipment comprises an operation device that is operable to provide an operation event, an extensive time counter that counts overflow of the time counter of the audio equipment for extending the time to a span sufficient to cover an occurrence of the operation event, a time stamp section that acquires time information corresponding to the occurrence of the operation event in terms of the extended time provided by the extensive time counter, and that applies a time stamp representative of the acquired time information to the operation event, and a transmitter that transmits the operation event together with the applied time stamp to the control equipment via the network. The control equipment comprises a receiver that receives the operation event together with the time stamp via the network, an extensive time counter that counts overflow of the time counter of the control equipment for extending the time to a span sufficient to cover the occurrence of the operation event, a recording section that records the received operation event together with the time stamp. One of the control equipment and the audio equipment transmits extended time information data representative of the extended time to the network at a specified timing. The other of the control equipment and the audio equipment receives the extended time information data through the network so that the extended times can be synchronized with each other between the control equipment and the audio equipment.

Preferably, one of the control equipment and the audio equipment transmits the extended time information data at the specified timing which is selected from a timing when one of the control equipment and the audio equipment starts communication with the network, a timing when the recording section of the control equipment starts recording of the operation events, and a timing when the extended time counted in one of the control equipment and the audio equipment reaches a specified time.

Another inventive automix system comprises a plurality of equipments connected to each other through a network, and including an audio equipment and a control equipment capable of providing operation events for conducting automix of audios. One of the plurality of the equipments uses its own time counter to count time and transmits time information data indicative of the counted time to the network at a specified cycle. Other equipment uses its own time counter for counting time, receives the time information data through the network, and corrects the counted time based on the received time information data, thereby synchronizing the time counted by each time counter of each equipment connected to the network. The control equipment comprises an extensive time counter that counts overflow of the time counter of the control equipment for extending the time to a span sufficient to cover occurrences of operation events, a storage section that previously records a plurality of operation events together with time stamps indicating occurrence times of the respective operation events, a reading section that operates based on the extended time for reading out the plurality of the operation events from the storage section prior to the occurrence times indicated by the time stamps, a transmitter that transmits the operation events read out from the storage section together with the time stamps to the audio equipment via the network. The audio equipment comprises an extensive time counter that counts overflow of the time counter of the audio equipment for extending the time to a span sufficient to cover the occurrence times of the operation events, a receiver that receives the operation events together with the time stamps from the control equipment via the network, a detecting section that operates based on the extended time for detecting the occurrence times corresponding to the time stamps provided to the respective operation events, and an executing section that executes the operation events at the detected occurrence times. One of the control equipment and the audio equipment transmits extended time information data representative of the extended time to the network at a specified timing. The other of the control equipment and the audio equipment receives the extended time information data through the network so that the extended times can be synchronized with each other between the control equipment and the audio equipment.

Preferably, the storage section of the control equipment previously records the plurality of the operation events divided into one group of operation events allocated to one audio equipment, and another group of operation events allocated to another audio equipment, and the transmitter of the control equipment transmits said one group of the operation events to said one audio equipment at once, and transmits said another group of the operation events to said another audio equipment at once.

Preferably, one of the control equipment and the audio equipment transmits the extended time information data at the specified timing which is either a timing when one of the control equipment and the audio equipment starts communication with the network or a timing when the extended time counted in one of the control equipment and the audio equipment reaches a specified time.

According to the present invention, one of the control equipment and the audio equipment of the automix system transmits time information data to the network, and the other of the control equipment and the audio equipment receives the time information data to thereby synchronize times with each other between the control equipment and the audio equipment that are connected to the network. The audio equipment obtains time information about a manipulated operation device based on the time information data received from the network and provides an operation event with that time information as a time stamp. The operation event provided with the time stamp is transmitted from the audio equipment to the control equipment via the network. This enables the control equipment to record the operation events with no time lag between the audio equipment and the control equipment.

When reproducing song data recorded with the operation event together with the time stamp, the recorded operation event is read out together with the occurrence time information prior to the performance timing of the operation event. The read operation event is then transmitted to the audio equipment. The audio equipment can detect the operation event occurrence time based on the cycle time of the audio equipment concerned. The operation event can be executed in precise synchronization with music performance by the control equipment.

DETAILED DESCRIPTION OF THE INVENTION

Figure 1:
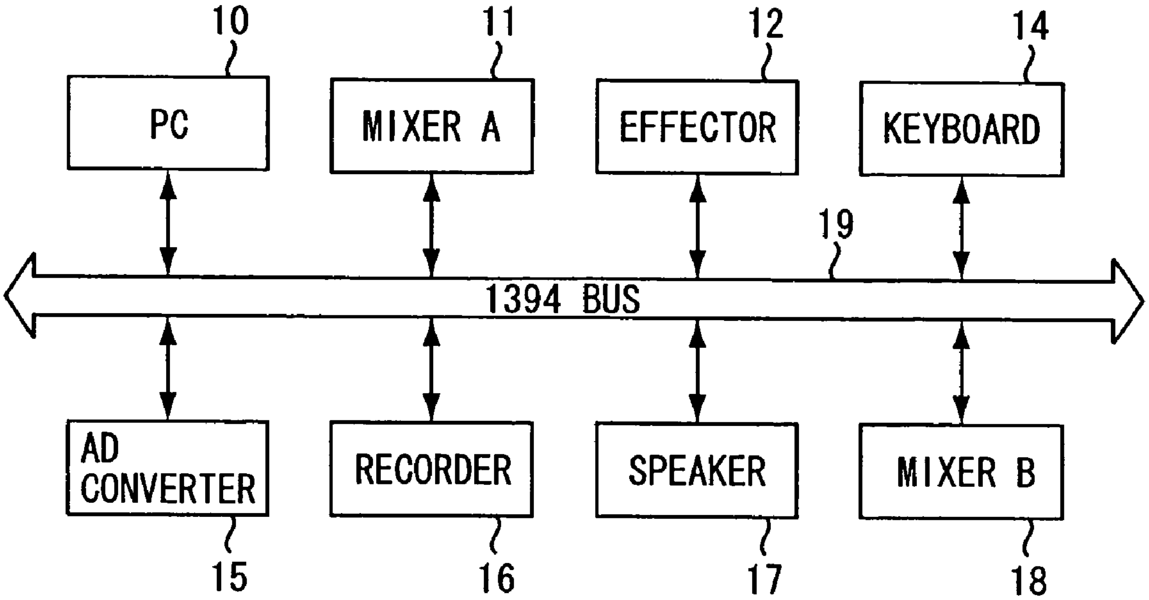
FIG. 1 shows a configuration of the automix system according to an embodiment of the present invention.
Figure 2:
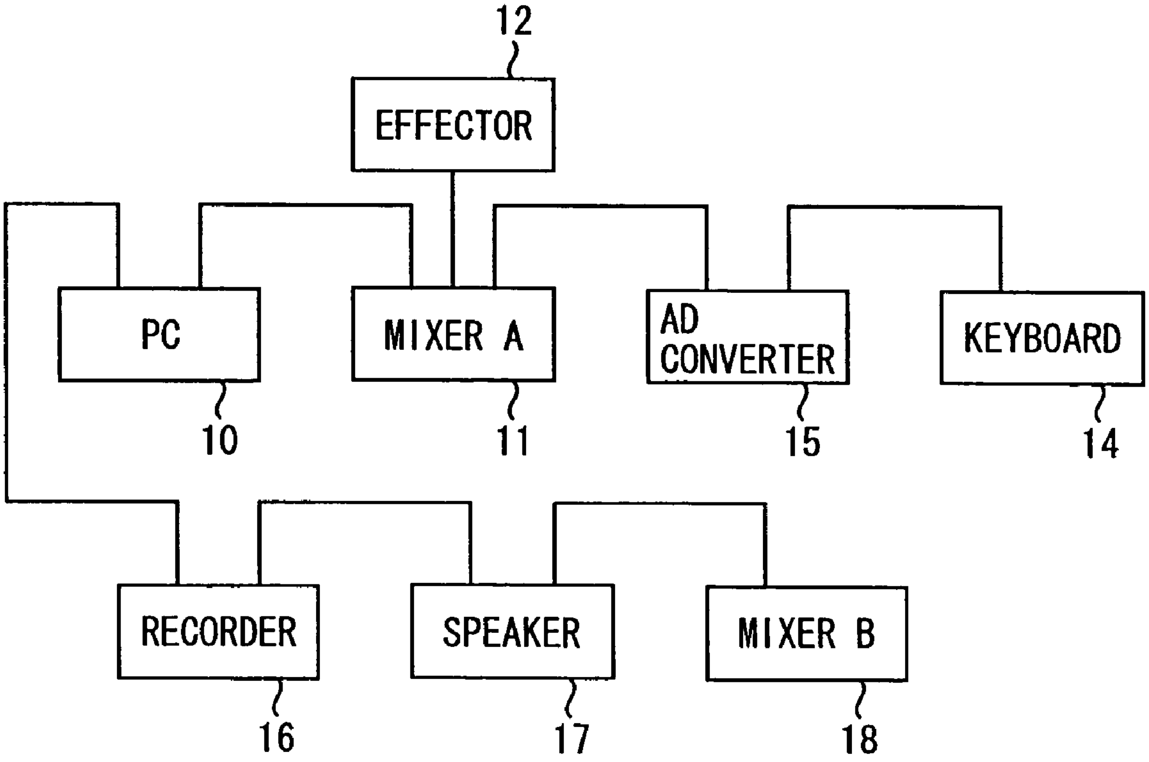
FIG. 2 exemplifies physical connection of the automix system according to the embodiment of the present invention.

FIG. 1 shows a configuration of the automix system according to an embodiment of the present invention. FIG. 2 shows an example of its physical connection.

As shown in FIGS. 1 and 2, a personal computer (PC) 10, a mixer A 11, an effector 12, a keyboard 14, an AD converter 15, a recorder 16, a speaker 17, and a mixer B 18 are connected to a 1394 bus 19, i.e., a serial bus compliant with the IEEE (Institute of Electrical and Electronics Engineers, Inc.) 1394 standard to be described later. The PC 10 is installed with at least sequencer software as application software. The PC 10 can operate as a sequencer. While the PC 10 functions as the sequencer to reproduce song data, the mixer A 11 and the mixer B 18 can perform mixing operations for reproduced song data in accordance with operations of the mounted fader operation devices. While the PC 10 functions as the sequencer to reproduce song data, the effector 12 can perform effect operations for reproduced song data in accordance with operations of the mounted effect operation devices. When a user operates an operation device on the mixer A 11, the mixer B 18, or the effector 12, an operation event occurs. The operation event is transformed into a MIDI message provided with a time stamp corresponding to the operation event occurrence. The MIDI message is then transformed into a packet compliant with the 1394 bus standard and is transmitted to the PC 10 via the 1394 bus 19. The PC 10 receives the MIDI message provided with the time stamp. When the automix is specified, the MIDI message is recorded on any of tracks constituting the song data under control of the PC 10. The keyboard 14 can function as an apparatus to input performance information to the PC 10 functioning as the sequencer. In this case, when a user operates the keyboard 14 for performance, an operation event occurs. The operation event is transformed into a MIDI message provided with a time stamp corresponding to the operation event occurrence. The MIDI message is then transformed into a packet compliant with the 1394 bus standard and is transmitted to the PC 10 via the 1394 bus 19. The PC 10 receives the MIDI message provided with the time stamp. The MIDI message is recorded on any of tracks constituting the song data under control of the PC 10.

The AD converter 15 converts an input multi-channel analog waveform into digital waveform data. The AD converter 15 can convert multi-channel analog waveforms into digital waveform data. The converted digital waveform data can be recorded on the recorder 16. The recorder 16 can record digital waveform data and song data in the MIDI format and the like. The speaker 17 is provided as an active speaker and generates musical sound reproduced by the PC 10 functioning as the sequencer. The IEEE1394 topology is available as any of daisy chain, tree, and star networks. In the example of FIG. 2, the mixer B 18, the speaker 17, the recorder 16, the PC 10, the mixer A 11, the AD converter 15, and the keyboard 14 are connected in a daisy-chain topology. A branch is made from the mixer A 11 to connect to the effector 12. A cable used for connection between these equipments includes two pairs of differential signal lines.

Figure 3:
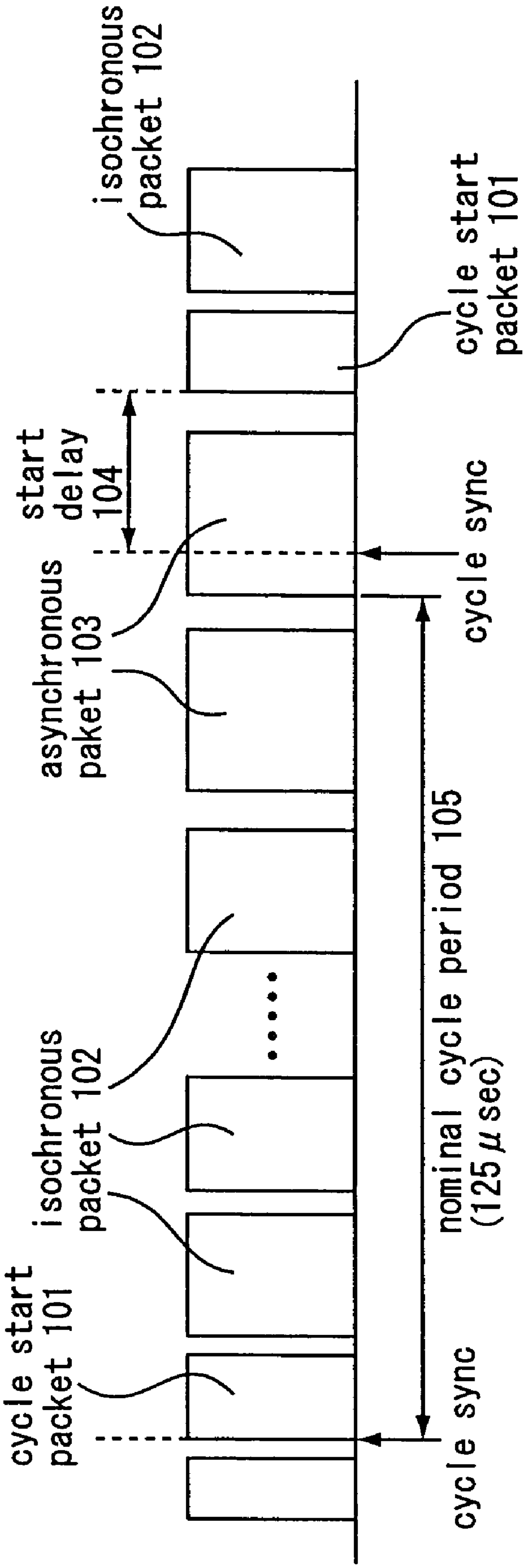
FIG. 3 shows an example of packets passing through a 1394 bus in the automix system according to the embodiment of the present invention.

Then, IEEE1394 to be described supports isochronous and asynchronous transfers. The isochronous transfer previously ensures a band so as to be capable of highly realtime data transfer with a proven time delay. The asynchronous transfer asynchronously transfers data. FIG. 3 shows an example of disposing packets passing through the 1394 bus 19. As shown in FIG. 3, three types of packets are transmitted to the 1394 bus 19, i.e., a cycle start packet 101, an isochronous packet 102, and an asynchronous packet 103. The cycle start packet 101 is transmitted from the equipment designated as a cycle master to the 1394 bus 19 at every nominal cycle period 105. The cycle start packet 101 starts a new transmission cycle. The nominal cycle period for a cycle timer is configured to be 125 μsec (8 kHz).

The cycle master has a precision clock source. Basically, the cycle master transmits the cycle start packet 101 at 125 μsec, i.e., at the time interval for the cycle timer timing. When another packet is being transferred, transmission of the cycle start packet 101 is forced to wait until the transfer of another packet is complete. A start delay 104 indicates this wait time. The start delay 104 is coded in the cycle start packet 101 and is transmitted to each equipment. It is ensured that a packet transmitted from one equipment is received by another equipment within the same clock period.

Each equipment compliant with the IEEE1394 bus standard has a 32-bit cycle timer register. The cycle timer register uses the 12 least significant bits to count the system's reference clock, i.e., a 24.576 MHz clock signal (40.7 nsec cycle) based on modulus 3072. In this manner, a reference cycle of 8 kHz (125 μsec) is generated. The cycle timer register uses the 13 next low-order bits to count the 8 kHz reference cycle. The cycle timer register uses the 7 extended high-order bits to count seconds. The cycle master uses the cycle start packet 101 to copy the 12-bit count value for the reference clock, the 13-bit count value for the reference cycle, and the content of seven low-order bits in the count value for seconds in its cycle timer register, to other cycle timer registers of all equipments, thus synchronizing all equipments within a given phase difference. In this manner, the IEEE1394 ensures the common time base. The detail of the cycle timer register is disclosed in U.S. Pat. Nos. 6,477,181 and 6,333,938. The disclosure of these patents is herein incorporated by referencing thereto.

The isochronous packet 102 is a channel used to transfer such data requiring precise timing as digital sound, video, and music performance data. It is ensured that up to 63 channels of isochronous packets 102 are transmitted as long as up to 100 μs within each transmission cycle. The asynchronous packet 103 is asynchronously transmitted when the transmission cycle contains an idle time after termination of the transmission of the isochronous packet 102. The length of the asynchronous packet is configured to be up to 75 μs. In this case, the transfer of an asynchronous packet continues until that packet terminates. Accordingly, the packet may be transferred over the cycle timer cycle.

Each equipment in the automix system according to the present invention is further provided with a 12-bit timer register at an order higher than the cycle timer register. The 12-bit timer register counts clocks output from the cycle timer register every 128 seconds. That is to say, the timer register can count approximately 145 successive hours without an overflow. This 12-bit timer register is an extensive time counter that counts overflow of the Cycle timer register for extending the time to a span sufficient to cover an occurrence of the operation event.

Figure 4:
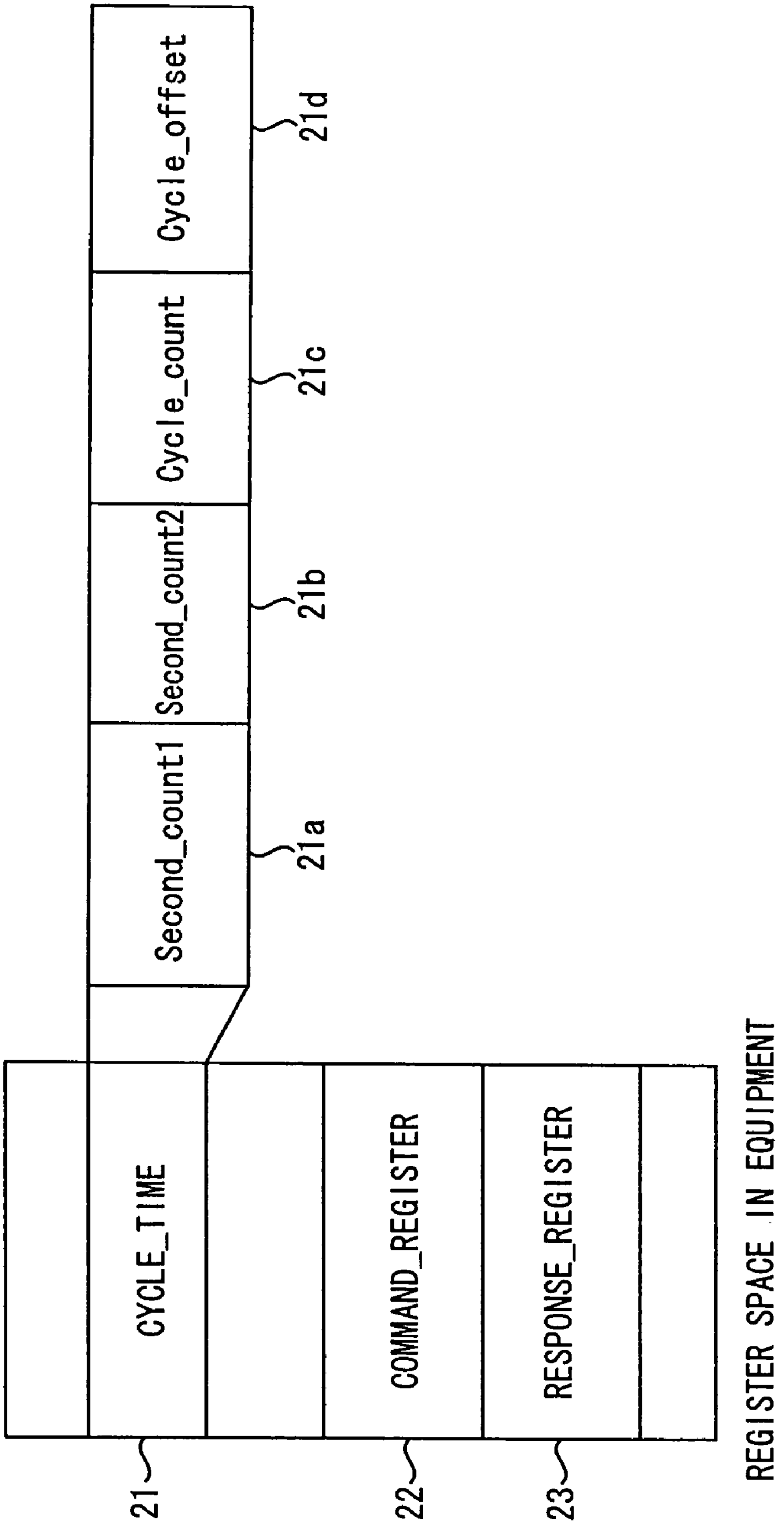
FIG. 4 shows a configuration of a register space in each equipment in the automix system according to the embodiment of the present invention.

FIG. 4 shows a register space in each equipment.

The register space in each equipment contains a cycle register (CYCLE_TIME) 21, a command register (COMMAND_REGISTER) 22, and a response register (RESPONSE_REGISTER) 23. The cycle register 21 comprises a cycle timer register and a timer register to store time information sent from the cycle start packet 101. The command register 22 is used to write a command transmitted from the other equipment to the equipment concerned. When a command is transmitted to the other equipment, a response to the command is returned to the equipment concerned and is written to the response register 23. The command register 22 and the response register 23 each comprise 512 bytes. The cycle register 21 comprises 44 bits, i.e., 32 bits for the cycle timer register and 12 bits for the timer register. The cycle timer register comprises a 12-bit cycle offset (Cycle_offset) 21*d*, a 13-bit cycle count (Cycle_count) 21*c*, and a 7-bit secondary second count (Second_count2) 21*b*. The cycle offset 21*d* indicates an offset time for the start delay 104 in FIG. 3. The cycle count 21*c* represents a count value for the reference cycle (125 μsec). The secondary second count 21*b* represents a count value for seconds. The timer register comprises a 12-bit primary second count (Second_count1) 21*a* that represents a count value for high-order seconds in the secondary second count 21*b*.

The cycle timer register provides the 7-bit second count value (128 sec) which may be too small to represent time points in the performance time of one song. However, the 12-bit timer register can represent up to approximately 145 hours. The cycle master transmits the cycle start packet comprising 32 bits in total, i.e., 12 bits for the cycle offset 21*d* indicating the offset time of the start delay 104; 13 bits for the cycle count 21*c* as the count value for the reference cycle (125 μsec); and 7 bits for the secondary second count 21*b* as the second count value. These 32 bits are stored in the cycle timer register in each equipment that received the cycle start packet. Each time the secondary second count 21*b* overflows, each equipment increments by one the count value of the primary second count 21*a* as the timer register.

Figure 5:
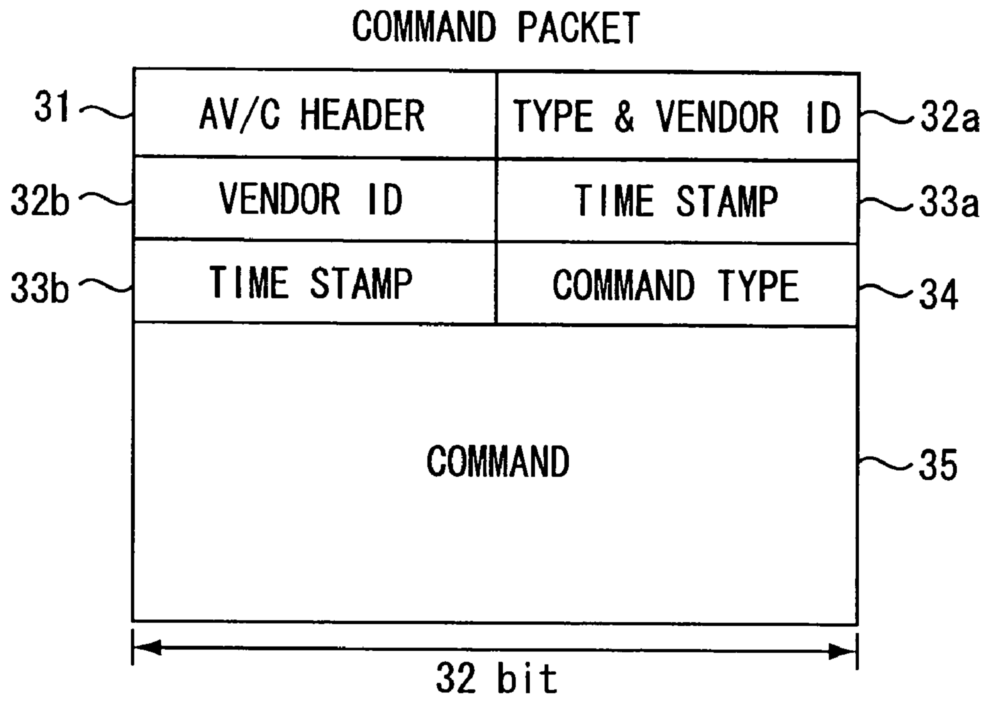
FIG. 5 shows a configuration of an AV/C command in the automix system according to the embodiment of the present invention.

FIG. 5 shows a configuration of an AV/C command packet that is transmitted by being written to the command register 22.

Figure 6A:
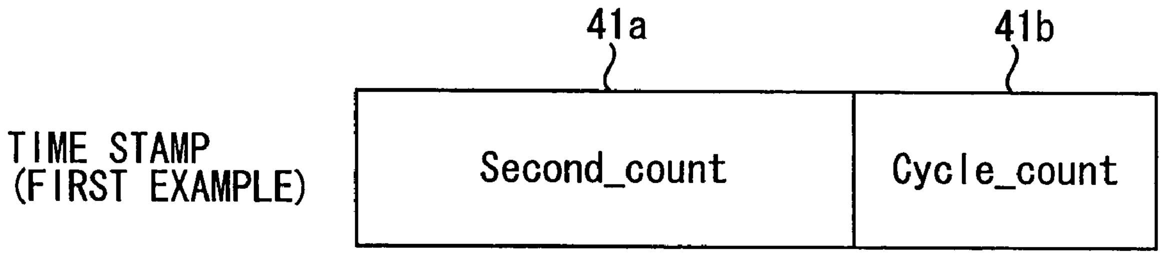
FIGS. 6(*a*) and 6(*b*) exemplify configurations of time stamps used in the automix system according to the embodiment of the present invention.
Figure 6B:
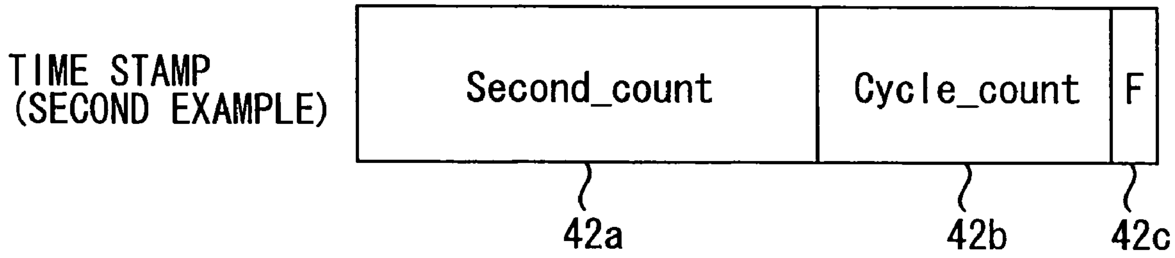

The AV/C command is defined to be a command set for remotely controlling AV equipment connected to the IEEE1394 bus. The AV/C command in the command set used for the present invention comprises an AV/C header 31, a type & vendor IDs 32*a* and 32*b*, time stamps 33*a* and 33*b*, a command type 34, and a command 35. The time stamps 33*a* and 33*b* each comprise 32 bits. FIG. 6(*a*) shows a first example of the 32-bit time stamp. According to the first example in FIG. 6(*a*), a cycle count (Cycle_count) 41*b* comprises 13 bits and indicates a count value for the reference cycle (125 μsec). A second count (Second_count) 41*a* comprises 19 bits and indicates a count value for seconds. In the time stamp, the count value for the cycle count 41*b* is a copy of the 13-bit register value for the cycle count 21*c* in the cycle timer register 21. The count value for the second count (Second_count) 41*a* is a copy of the 19-bit register value, i.e., the sum of 12 high-order bits for the primary second count 21*a* in the timer register and 7 low-order bits for the secondary second count 21*b* in the cycle timer register.

FIG. 6(*b*) shows a second example of the 32-bit time stamp. According to the second example in FIG. 6(*b*), a cycle count (Cycle_count) 42*b* comprises 13 bits and indicates the count value for the reference cycle (125 μsec). A second count (Second_count) 42*a* comprises 18 bits and indicates the count value for seconds. A flag bit F 41*c* comprises one bit and indicates the on/off-state. In the time stamp, the count value for the cycle count 41*b* is a copy of the 13-bit register value for the cycle count 21*c* in the cycle timer register 21. The count value for the second count (Second_count) 41*a* is a copy of the 18-bit register value in 19 bits, i.e., the sum of 12 high-order bits for the primary second count 21*a* in the timer register and 7 low-order bits for the secondary second count 21*b* in the cycle timer register.

Figure 7:
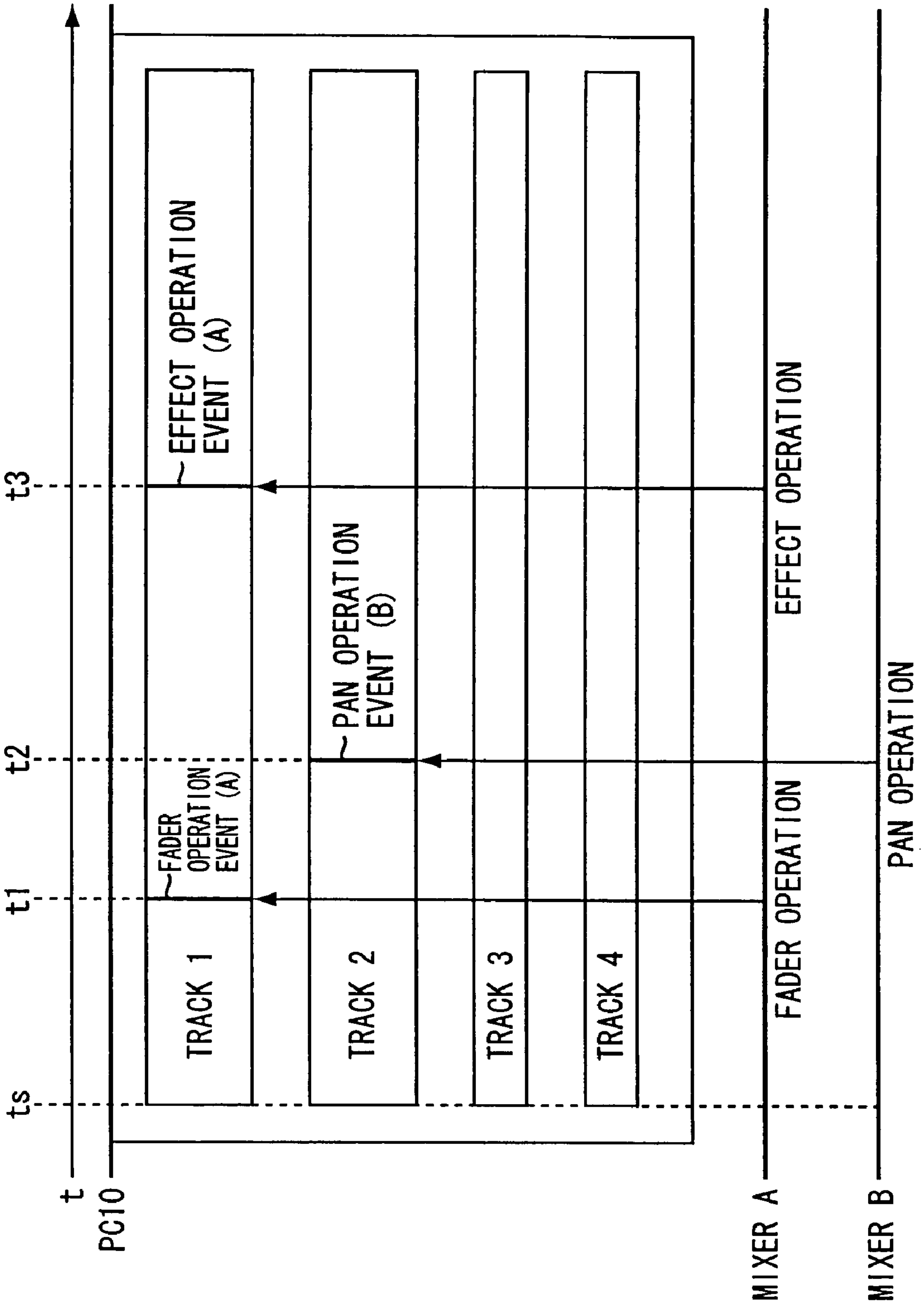
FIG. 7 is a timing chart showing automix operations performed in the automix system according to the embodiment of the present invention.

Referring now to a timing chart in FIG. 7, the following describes operations of the sequencer that concurrently reproduces tracks and records automix tracks in the automix system according to the present invention.

The timing chart in FIG. 7 shows that tracks 1 and 2 are used as automix recording tracks. Further, the timing chart shows that the PC 10 functioning as the sequencer reproduces performance data recorded on tracks 3 and 4. Time ts indicates the timing when the PC 10 functioning as the sequencer starts performance. At this start timing, the sequencer reads performance data from the tracks 3 and 4 and generates musical sounds corresponding to the performance data. When generating a musical sound, a CPU (Central Processing Unit), though not shown, in the PC 10 supplies sound source parameter information to sound source means (not shown) in the PC 10 functioning as the sequencer based on the performance data that is read at the performance timing. The CPU also issues a command to start generating the sound. The sound source parameter information contains an allocated channel, pitch data, an envelope parameter, and the like. The musical sound data generated by the sound source means in the PC 10 can be transferred to other equipment such as mixer A 11 by means of the IEEE1394 isochronous transfer.

Let us assume that a fader on the mixer A 11 is operated to change a mixing ratio between reproduced musical sounds on the tracks 3 and 4 at timing t1. A fader operation event (A) is provided with a time stamp for time t1, i.e., the time indicating occurrence of the operation event to operate the fader. The fader operation event (A) provided with the time stamp is processed in the mixer A 11 for transmission and is transformed into the isochronous packet 102. The isochronous packet 102 is then transmitted to the PC 10 via the 1394 bus 19. When receiving the isochronous packet 102, the PC 10 extracts the fader operation event (A) provided with the time stamp from the isochronous packet 102 and records the fader operation event (A) on track 1. In this case, it is characteristic of the present invention that the time to operate the fader on the mixer A 11 is indicated by the cycle register (CYCLE_TIME) 21 and is supplied to the fader operation event (A) as a time stamp. In this manner, the time in the equipment where an operation event occurs is supplied as a time stamp to the operation event instead of supplying the time of receiving the operation event by the PC 10 to the operation event as a time stamp. The cycle start packet 101 allows the cycle register (CYCLE_TIME) 21 to provide the consistent time for the equipments connected to the 1394 bus 19. As a result, the operation event is supplied with a time stamp for the precise time without a time lag due to transmission processes in the equipments.

Further, let us assume that a pan operation device is operated on the mixer B 18 at timing t2 to change the localization state of the reproduced musical sound. A pan operation event (B) is provided with a time stamp for time t2, i.e., the time indicating an occurrence of the operation event to operate the pan operation device. The pan operation event (B) provided with the time stamp is processed in the mixer B 18 for transmission and is transformed into the isochronous packet 102. The isochronous packet 102 is then transmitted to the PC 10 via the 1394 bus 19. When receiving the isochronous packet 102, the PC 10 extracts the pan operation event (B) provided with the time stamp from the isochronous packet 102 and records the pan operation event (B) on track 2. Also in this case, the time to operate the pan operation device on the mixer B 18 is indicated by the cycle register (CYCLE_TIME) 21 and is supplied to the pan operation event (B) as a time stamp. Moreover, let us assume that an effect operation device on the mixer A 11 is operated to change the effect of the reproduced musical sound at timing t3. There is provided a time stamp for time t3, i.e., the time indicating an occurrence of the event. The fader operation event (A) provided with the time stamp is processed in the mixer A 11 for transmission and is transformed into the isochronous packet 102. The isochronous packet 102 is then transmitted to the PC 10 via the 1394 bus 19. When receiving the isochronous packet 102, the PC 10 extracts the effect operation event (A) provided with the time stamp from the isochronous packet 102 and records the effect operation event (A) on track 1. Also in this case, the time to operate the effect operation device on the mixer A 11 is indicated by the cycle register (CYCLE_TIME) 21 and is supplied to the effect operation event (A) as a time stamp. A unique ID is provided for each of the equipments connected to the 1394 bus 19. The unique ID is attached to the isochronous packet 102 and is transmitted. In this manner, the PC 10 can identify the equipment that transmitted the operation event to record it on the corresponding track.

In this manner, the time in the equipment where an operation event occurs is supplied as a time stamp to the operation event instead of supplying the time of receiving the operation event by the PC 10 to the operation event as a time stamp. The cycle start packet 101 allows the cycle register (CYCLE_TIME) 21 to provide the consistent time for the equipments connected to the 1394 bus 19. As a result, the operation event is supplied with a time stamp for the precise time without a time lag due to transmission processes in the equipments. As shown in FIG. 7, the time stamps are provided for the fader operation event (A), the pan operation event (B), and the effect operation event (A). These events are recorded on the automix tracks to constitute song data in the MIDI format, for example. When the PC 10 functioning as the sequencer reproduces such song data, it is possible to reproduce the musical sound that automatically changes the mixing ratio, the localization state, and the effect at the precise timings when the corresponding operation devices were operated.

Figure 8:
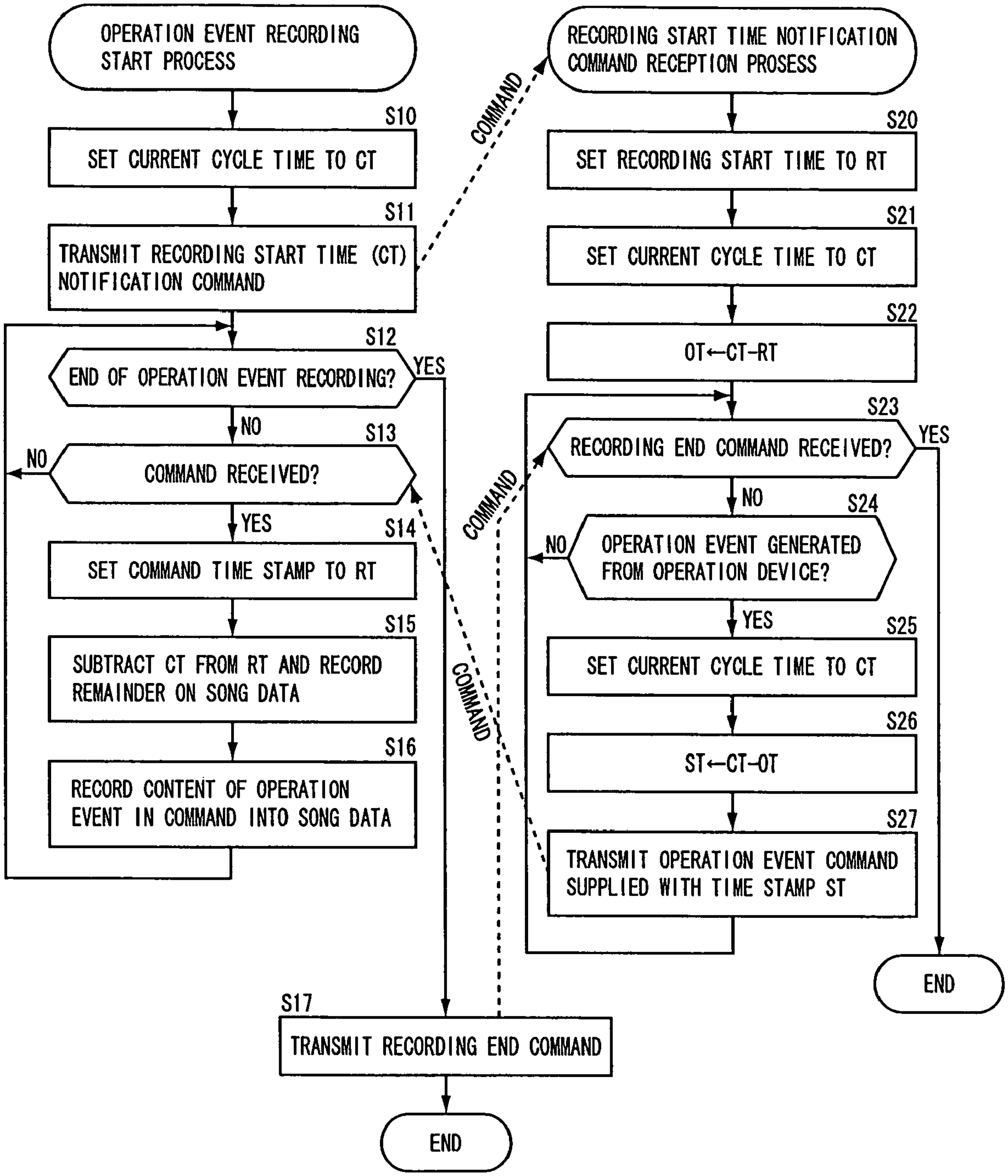
FIG. 8 is a flowchart showing an operation event recording start process performed in the control equipment and a recording start time notification command reception process performed in the audio equipment in the automix system according to the embodiment of the present invention.

FIG. 8 shows flowcharts for an operation event recording start process performed in the control equipment and a recording start time notification command reception process performed in the audio equipment during automixing in the automix system according to the present invention. The following description assumes the control equipment to be the PC 10 and the audio equipments to be the mixer A 11 and the mixer B 18.

When the automix is specified in FIG. 8, the operation event recording start process starts in the PC 10. At step S10, the process sets the current cycle time to CT. The current cycle time is stored in the cycle register (CYCLE_TIME) 21 of the PC 10 and comprises 32 bits in total, i.e., the cycle count 21*c*

(13 bits), the secondary second count 21*b* (7 bits), and the primary second count 21*a* (12 bits). At step S11, the process transmits a command to notify CT as the recording start time. As shown in FIGS. 1 and 2, the command is written to the command register 22 of the mixer A 11 and the mixer B 18. The current cycle time CT to be written to the command register 22 may comprise 19 bits in total, i.e., the secondary second count 21*b* (7 bits) and the primary second count 21*a* (12 bits). Even in this case, the cycle start packet sends the cycle count 21*c* (13 bits) to each equipment, causing no time lag.

The mixer A 11 and the mixer B 18 receive the command notifying the recording start time by writing the command to the command register 22 to start the recording start time notification command reception process. At step S20, the process sets the notified recording start time to RT. In this case, the recording start time RT is assumed to comprise 32 bits. When the notified recording start time is represented in 19 bits, it is assumed to be 32 bits by adding the cycle count 21*c* (13 bits) of the equipment concerned to the low order. At step S21, the current cycle time is set to CT. The current cycle time is stored in the cycle register (CYCLE_TIME) 21 of the audio equipment. In this case, the cycle time CT is assumed to comprise 32 bits in total, i.e., the cycle count 21*c* (13 bits), the secondary second count 21*b* (7 bits), and the primary second count 21*a* (12 bits). At step S22, the recording start time RT is subtracted from the cycle time CT to yield an offset time OT. The offset time OT represents a time difference between the recording start time notified by the above-mentioned command from the PC 10 and the recording start time when the mixer A 11 or the mixer B 18 receives that command.

At step S23, it is determined whether or not a recording end command is received from the control equipment. The result is assumed to be NO since the recording end command is not received at this point. The process proceeds to step S24. At step S24, it is determined whether or not an operation event occurred in response to operation of a fader, pan, or effect operation device on the mixer A 11 or the mixer B 18 functioning as the audio equipment. When it is determined that an operation event occurred in response to operation of the operation device, the process proceeds to step S25. The current cycle time stored in the cycle register (CYCLE_TIME) 21 is set to CT. In this case, the cycle time CT is assumed to comprise 32 bits in total, i.e., the cycle count 21*c* (13 bits), the secondary second count 21*b* (7 bits), and the primary second count 21*a* (12 bits). At step S26, the process calculates a difference between the cycle time CT and the offset time OT calculated at step S22 to yield a 32-bit time stamp ST. In this manner, the process finds a time difference between the recording start times for the PC 10 and the mixer A 11 or the mixer B 18, and then subtracts the time difference from the cycle time CT. The result is converted into the current time in the PC 10 and is assumed to be the time stamp ST.

At step S27, the process adds ST as the time stamp calculated at step S26 to the operation event detected at step S24. The process transmits a command for the operation event provided with the time stamp ST to the PC 10. The process returns to step S23 and repeats steps S23 through S27. When it is determined at step S24 that no command is received for the operation event, the process returns to step S23 and repeats steps S23 and S24. The repetitive process continues until the recording end command is received from the PC 10. In this manner, the precise time stamp is added to operation events occurred in response to operation of the operation devices on the mixer A 11 and the mixer B 18. These operation events are sequentially transmitted to the PC 10. Receiving the recording end command at step S23 terminates the recording start time notification command reception process that is performed in the audio equipments, i.e., the mixer A 11 and the mixer B 18.

On the PC 10, the process proceeds from step S11 to step S12 to determine whether or not the operation event recording ends. In this case, the result is assumed to be NO since the operation event recording does not end. The process then proceeds to step S13. At step S13, it is determined whether or not the operation event command is received from the mixer A 11 or the mixer B 18. When it is determined that the operation event command is received from the mixer A 11 or the mixer B 18, the process proceeds to step S14 and sets the 32-bit time stamp provided for the operation event command to RT. At step S15, the process subtracts the 32-bit recording start time CT from the time stamp RT. The result is recorded as the event occurrence time on a specified track. The event occurrence time is a relative time elapsed from the start time ts in FIG. 7. At step S16, the process records the content of the operation event in the command on the specified track for song data as shown in FIG. 7.

The process returns to step S12 and repeats steps S12 through S16. When it is determined at step S13 that no command is received for the operation event, the process returns to step S12 and repeats steps S12 and S13. The operation event recording is performed at step S13 each time an operation event is received from the mixer A 11 and the mixer B 18. When the PC 10 functioning as the sequencer terminates reproduction of the song, it is determined at step S12 that the operation event recording ends. The process branches to step S17. At step S17, the recording end command is transmitted to the mixer A 11 and the mixer B 18. Then, the PC 10 terminates the operation event recording start process. When the mixer A 11 and the mixer B 18 receive the recording end command, the process for the command reception is performed at step S23. The executing recording start time notification command reception process terminates.

Figure 9:
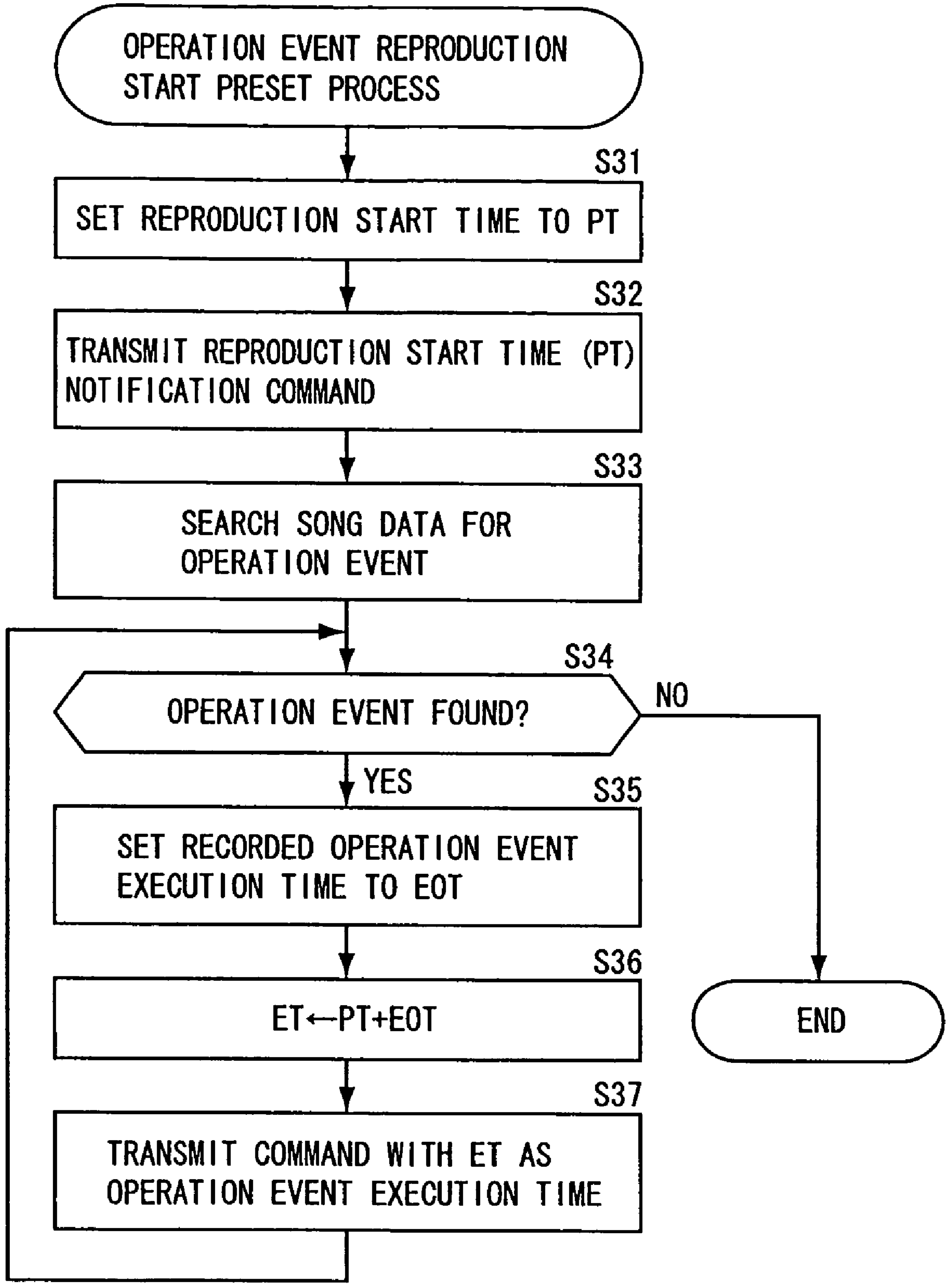
FIG. 9 is a flowchart showing an operation event reproduction start preset process performed in the control equipment of the automix system according to the embodiment of the present invention.

Then, let us suppose that the control equipment reproduces, e.g., MIDI-formatted song data including the automix track. The mixer A 11 and the mixer B 18 reproduce the operations at the same timings as for the operations that were performed on the mixer A 11 and the mixer B 18 during the automix recording. FIG. 9 shows a flowchart of an operation event reproduction start preset process performed on the PC 10 as the control equipment in this case.

When the control equipment reproduces a song including the automix track, the operation event reproduction start preset process in FIG. 9 starts simultaneously with automatic performance of the sequencer tracks. At step S31, the process sets a reproduction start time, i.e., the current cycle time, to PT. The reproduction start time PT is represented in 32 bits comprising a 13-bit count value for the reference cycle (125 μsec) and a 19-bit count value for seconds. The reproduction start time PT can be automatically determined from the 32-bit time in the cycle register (CYCLE_TIME) 21. At step S32, the process transmits a command notifying the reproduction start time PT to the mixer A 11 and the mixer B 18. Upon reception of the command for the reproduction start time PT, the mixer A 11 and the mixer B 18 calculate a difference (CT−PT) between the current cycle time CT and the reproduction start time PT to yield an offset time OT in the same manner as the automix recording.

At step S33, the process starts searching for an operation event on the automix track in the song data to be reproduced. The search is performed for one piece of song data. At step S34, it is determined whether or not the search result shows detection of an operation event in the song data. When the operation event is detected, the process proceeds to step S35 to read the execution time recorded in the first detected operation event. The read execution time is set to EOT. The execution time EOT is represented as a relative time in 32 bits comprising a 13-bit count value for the reference cycle (125 μsec) and a 19-bit count value for seconds. At step S36, the process adds the reproduction start time PT set at step S31 to the execution time EOT to calculate an absolute execution time ET. A command is used to notify the execution time ET as the execution time for the detected operation event along with the operation event. At step S34, the process transmits the command to the equipment executing the operation event, i.e., the mixer A 11 or the mixer B 18 corresponding to the automix track. The process returns to step S34. If another operation event is detected next, the process reexecutes steps S35 through S37. The process repeats steps S34 through S37 to transmit all commands that notify the execution time ET for operation events in one piece of song data. Then, at step S34, it is determined that no operation event remains. At this time, the operation event reproduction start preset process terminates.

When receiving the command for the operation event and the execution time ET, the mixer A 11 or the mixer B 18 adds the offset time OT to the execution time ET to calculate an execution time XT in that equipment. The mixer A 11 or the mixer B 18 executes the operation event at the timing when the cycle time CT of the mixer A 11 or the mixer B 18 reaches the calculated execution time XT. In this manner, the process detects the execution time of the operation event by using the cycle time CT of the mixer A 11 or the mixer B 18 that should execute the operation event. Accordingly, it is possible to provide accurate timing to execute the operation event. There may be an alternative to searching the automix track for operation events at a time. That is to say, it may be preferable to search for operation events little by little before the timing of the execution time EOT in the song data to be reproduced.

Figure 10:
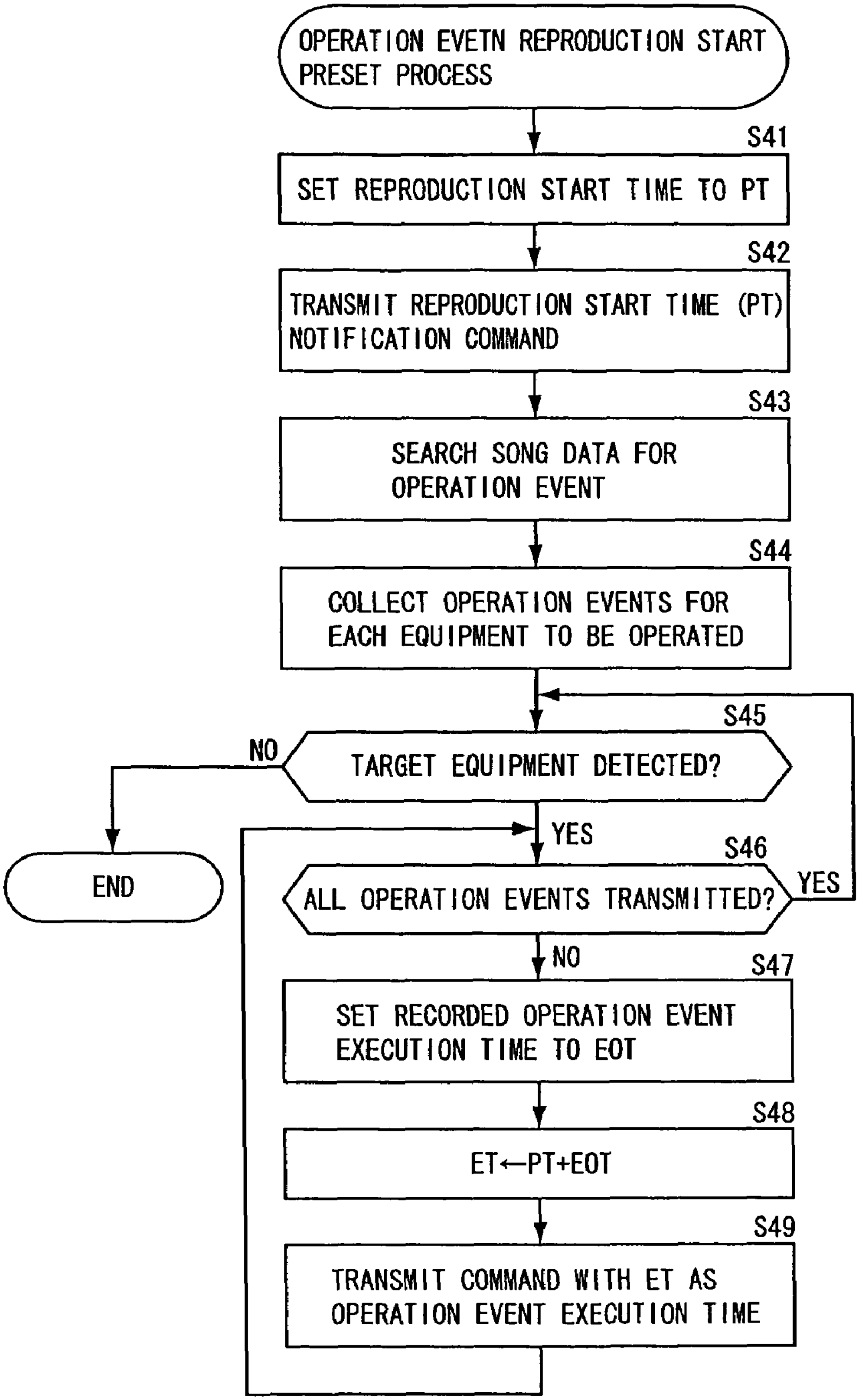
FIG. 10 is another flowchart showing the operation event reproduction start preset process performed in the control equipment of the automix system according to the embodiment of the present invention.

FIG. 10 is a flowchart showing another example of the above-mentioned operation event reproduction start preset process performed on the PC 10 as the control equipment.

When the control equipment reproduces a song including the automix track, the operation event reproduction start preset process in FIG. 10 starts simultaneously with automatic performance of the sequencer tracks. At step S41, the process sets a reproduction start time, i.e., the current cycle time, to PT. The reproduction start time PT is represented in 32 bits comprising a 13-bit count value for the reference cycle (125 μsec) and a 19-bit count value for seconds. The reproduction start time PT can be automatically determined from the time in the cycle register (CYCLE_TIME) 21. At step S42, the process transmits a command notifying the reproduction start time PT to the mixer A 11 and the mixer B 18. Upon reception of the command for the reproduction start time PT, the mixer A 11 and the mixer B 18 calculate a difference (CT−PT) between the current cycle time CT and the reproduction start time PT to yield an offset time OT.

At step S43, the process starts searching for an operation event on the automix track in the song data to be reproduced. The search is performed for one piece of song data. At step S44, the process groups the detected operation events into equipments to be operated. At step S45, it is determined whether or not the search result shows equipment to be operated whose operation event is detected in the song data. When it is determined that there is the equipment to be operated, the process proceeds to step S46. Then, it is determined whether or not the process has transmitted all operation events recorded on the first detected equipment to be operated. Since the transmission is not complete in this case, the process proceeds to step S47 to read the execution time recorded in the first detected one of operation events grouped at step S44 for the equipment to be operated. The read execution time is set to EOT. The execution time EOT is represented as a relative time in 32 bits comprising a 13-bit count value for the reference cycle (125 μsec) and a 19-bit count value for seconds. At step S48, the process adds the reproduction start time PT set at step S41 to the execution time EOT to calculate an absolute execution time ET. A command is used to notify the execution time ET as the execution time for the detected operation event along with the operation event. At step S49, the process transmits the command to the equipment executing the operation event, i.e., the mixer A 11 or the mixer B 18.

The process returns to step S46. If another operation event is detected next, the process reexecutes steps S47 through S49. The process repeats steps S46 through S49 to transmit all commands that notify the execution times ET for operation events in one piece of song data for the first detected equipment to be operated. At step S46, it is determined that the process has transmitted all the execution times ET for operation events. The process then returns to step S45. If there are operation events grouped for the next detected equipment to be operated, the process repeats steps S46 through S49. In the same manner as mentioned above, the process chronologically transmits the command notifying the execution time ET of the operation event to the equipment to be operated. As a result, it may be determined at step S45 that there remains no equipment to be operated to which the process does not transmit the command notifying the execution times ET for the grouped operation events. In this case, the operation event reproduction start preset process terminates.

When receiving the command for the operation event and the execution time ET, the mixer A 11 or the mixer B 18 detects the timing of the execution time ET supplied with the offset time OT based on the cycle time CT and executes the operation event.

According to the above-mentioned operation event reproduction start preset process as shown in FIG. 9 or 10, the PC 10 starts reproducing the song's sequencer tracks and automix tracks. The mixer A 11, the mixer B 18, the effector 12, and the like detect timings indicated by the execution times ET for the operation events and execute the corresponding operation events. In this case, the cycle start packet synchronizes the time from the cycle timer register in each of the equipments connected to the 1394 bus 19. Further, as mentioned above, the execution time ET causes no time lag from the occurrence time of the original operation event. Consequently, the operation event is accurately executed in synchronization with the song reproduced in the PC 10.

It may be preferable to allow a user to specify any time stamp or reproduction start time supplied to the command during operation event reproduction. When the PC 10 reproduces an operation event, the command is received by the audio equipment such as the mixer A 11, the mixer B 18, or the like that may manage a reception buffer. The equipment may transmit such commands to the PC 10 as to notify a buffer-full state and to request for an operation event when the buffer is freed. The PC 10 may respond to these commands. Further, according to the above-mentioned description, the PC 10 reproduces operation events that chronologically occur in the song data. These operation events are transmitted one by one to the audio equipment. Instead, it may be preferable to transmit operation events in units of equipments. Moreover, it may be preferable to provide the command with a flag indicating whether or not the time stamp attached to the command is valid. Furthermore, the PC 10 may record song data in the MIDI format so that a general-purpose sequencer can reproduce the song data without any change.

While there has been described that an operation event to be recorded occurs at a relative time from the beginning of the song, the present invention is not limited thereto. The occurrence time for the operation event may be represented as a time interval between that operation event and the most recent one. To perform the automix, the PC 10 may record time information by converting it into the SMPTE (Society of Motion Picture and Television Engineers) or MTC (MIDI Time Code) format. Time information data may be transmitted to the network at the timing when the control equipment or the audio equipment starts network communication, when recording section of the control equipment starts recording, or when an extended time for the audio equipment or the control equipment reaches a specified time.

According to the present invention, as mentioned above, time information data is transmitted to the network and is received to synchronize times with each other between the control equipment and the audio equipment that are connected to the network. The audio equipment obtains time information about a manipulated operation device based on the time information data received from the network and provides an operation event with that time information as a time stamp. The operation event provided with the time stamp is transmitted from the audio equipment to the control equipment via the network. This enables the control equipment to record the operation events with no time lag between the audio equipment and the control equipment. When reproducing song data recorded with the operation event together with the time stamp, the operation event is read out together with the occurrence time information prior to the performance timing of the operation event. The read operation event is then transmitted to the audio equipment. In this manner, the audio equipment can detect the operation event occurrence time based on the cycle time of the audio equipment concerned. The operation event can be reproduced in precise synchronization by the audio equipment along with music performance of the control equipment.

What is claimed is:

1. An automix system comprising:

a plurality of equipments connected to each other through a network, said plurality of equipments including an audio equipment and a control equipment capable of recording event data for automated mixing of audio signals, wherein one of said plurality of the equipments use its own time counter to count time and repeatedly transmit, to the network in a periodic cycle of predetermined intervals, first time information representative of the counted time and the others of said plurality of equipments each use its own time counter for counting time, receive the first time information through the network, and correct the counted time based on the received first time information, thereby synchronizing the time counted by the time counter of the one equipment with the time counted by the time counters of the others of said plurality of equipments, wherein the audio equipment comprises:

an operation device that is operable by an user to provide event data indicative of an operation;

an extensive time counter that counts overflow of the time counter of the audio equipment to provide an extensive time of the audio equipment, wherein the time counted by the time counter of the audio equipment and the extensive time provided by the extensive time counter of the audio equipment constitute an extended time in the audio equipment;

a time stamp section that acquires, from the time counter of the audio equipment and the extensive time counter of the audio equipment, an extended time at which the event data is provided by said operating device, and affixes the acquired extended time to the event data as a time stamp; and a transmitter that transmits the event data together with the time stamp to the control equipment via the network, and wherein the control equipment comprises:

a receiver that receives the event data together with the time stamp via the network;

an extensive time counter that counts overflow of the time counter of the control equipment to provide an extensive time of the control equipment, wherein the time counted by the time counter of the control equipment and the extensive time provided by the extensive time counter of the control equipment constitute an extended time in the control equipment;

a recording section that records the received event data together with the time stamp, and wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

2. The automix system according to claim 1, wherein one of the control equipment and the audio equipment transmits the second time information when one of the control equipment and the audio equipment starts communication with the network.

3. An automix system comprising:

a plurality of equipments connected to each other through a network, said plurality of equipments including an audio equipment and a control equipment capable of recording and reproducing event data for automated mixing of audio signals, wherein one of the plurality of the equipments use its own time counter to count time and repeatedly transmit, to the network in a periodic cycle of predetermined intervals, first time information representative of the counted time, and the others of said plurality of equipments each use its own time counter for counting time, receive the first time information datathrough the network, and correct the counted time based on the received first time information, thereby synchronizing the time counted by the time counter of the one equipment with the time counted by the time counters of the others of said plurality of equipments, wherein the control equipment comprises:

an extensive time counter that counts overflow of the time counter of the control equipment to provide an extensive time of the control equipment, wherein the time counted by the time counter of the control equipment and the extensive time provided by the extensive time counter of the control equipment constitute an extended time in the control equipment;

a storage section that records a plurality of event data indicative of operations together with time stamps indicating occurrence times of the respective operation indicated by the respective event data;

a reading section that operates based on the extended time for reading out the plurality of the event data from the storage section prior to the occurrence times indicated by the time stamps; and a transmitter that transmits the event data read out from the storage section together with the time stamps to the audio equipment via the network, and wherein the audio equipment comprises:

an extensive time counter that counts overflow of the time counter of the audio equipment to provide an extensive time of the audio equipment. wherein the time counted by the time counter of the audio equipment and the extensive time provided by the extensive time counter of the audio equipment constitute an extended time in the audio equipment;

a receiver that receives the event data together with the time stamps from the control equipment via the network;

a detecting section that operates based on the extended time for detecting the occurrence times corresponding to the time stamps provided to the respective event data; and an executing section that executes the operation indicated by the respective event data at the detected occurrence times, and wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

4. The automix system according to claim 3, wherein said plurality of equipments includes another audio equipment, and wherein the storage section of the control equipment records the plurality of the event data divided into one group of event data allocated to the audio equipment, and another group of event data allocated to the other audio equipment, and wherein the transmitter of the control equipment transmits said one group of the event data to said audio equipment at once, and transmits said another group of the data to said another audio equipment at once.

5. The automix system according to claim 3, wherein one of the control equipment and the audio equipment transmits the second time information when one of the control equipment and the audio equipment starts communication with the network.

6. An audio equipment belonging to an automix system comprised of a plurality of equipments connected to each other through a network, said plurality of equipments including the audio equipment and a control equipment capable of recording event data for automated mixing of audio signals, wherein one of said plurality of the equipments use its own time counter to count time and repeatedly transmit, to the network in a periodic cycle of predetermined intervals, first time information representative of the counted time, and the others of said plurality of equipments each use its own time counter for counting time, receive the first time information data-through the network, and correct the counted time based on the received first time information, thereby synchronizing the time counted by the time counter of the one equipment with the time counted by the time counters of the others of said plurality of equipments, the audio equipment comprising:

an operation device that is operable by an user to provide event data indicative of an operation;

an extensive time counter that counts overflow of the time counter of the audio equipment to provide an extensive time of the audio equipment, wherein the time counted by the time counter of the audio equipment and the extensive time provided by the extensive time counter of the audio equipment constitute an extended time in the audio equipment;

a time stamp section that acquires. from the time counter of the audio equipment and the extensive time counter of the audio equipment, an extended time at which the event data is provided by said operating device, and affixes the acquired extended time to the event data as a time stamp; and a transmitter that transmits the event data together with the time stamp to the control equipment via the network, wherein one of the control equipment and the audio equipment transmits. to the network at a specified timing, second time information indicative of the extended time of the one of the control equipment and the audio equipment. and the other of the control equipment and the audio equipment receives the second time information and, based on the received, second time information, synchronizes the extended time of the other of the control equipment and the audio equipment with the extended time of the one of the control equipment and the audio equipment.

7. The audio equipment according to claim 6, comprising a mixer section for mixing audio signals fed from the other equipment in response to the event data.

8. A control equipment capable of recording event data for automated mixing of audio signals. said control equipment be1onging to an automix system comprised of a plurality of equipments connected to each other though a network, said plurality of equipments including the control equipment and an audio equipment, wherein one of the plurality of the equipments use its own time counter to count time and repeatedly transmit, to the network in a periodic cycle of predetermined intervals, first time information representative of the counted time, and the others of said plurality of equipments each use its own time counter for counting time, receive the first time information through the network, and correct the counted time based on the received first time information, thereby synchronizing the time counted by the time counter of the one equipment with the time counted by the time counters of the others of said plurality of equipments, the control equipment comprising:

a receiver that receives, from the audio equipment via the network, event data appended with a time stamp, the event data indicating an operation and the time stamp indicating the time when the event data is provided by an operative device of the audio equipment;

an extensive time counter that counts overflow of the time counter of the control equipment to provide an extensive time of the control equipment, wherein the time counted by the time counter of the control equipment and the extensive time provided by the extensive time counter of the control equipment constitute an extended time in the control equipment;

a recording section that records the received event data together with the time stamp, and wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

9. The control equipment according to claim 8, comprising a sequencer section for feeding audio signals to other equipment.

10. An audio equipment belonging to an automix system which is comprised of a plurality of equipments connected to each other through a network, said plurality of equipments including the audio equipment and a control equipment capable of recording and reproducing event data for automated mixing of audio signals, wherein one of the plurality of the equipments use its own time counter to count time and repeatedly transmit, to the network in a periodic cycle of predetermined intervals, first time information representative of the counted time, and the others of said plurality of equipments each use own time counter for counting time, receive the first time information through the network, and correct the counted time based on the received first time information, thereby synchronizing the time counted by the time counter of the one equipment with the time counted by the time counters of the others of said plurality of equipments the audio equipment comprising:

an extensive time counter that counts overflow of the time counter of the audio equipment to provide an extensive time of the audio equipment, wherein the time counted by the time counter of the audio equipment and the extensive time provided by the extensive time counter of the audio equipment constitute an extended time in the audio equipment:

a receiver that receives, from the control equipment via the network, event data together with time stamps, the event data indicating an operation and the time stamps indicating the occurrence time of the respective event data a detecting section that operates based on the extended time for detecting the occurrence times corresponding to the time stamps provided to the respective event data; and an executing section that executes the operation indicated by the respective event data at the detected occurrence times, wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

11. The audio equipment according to claim 10, comprising a mixer section for mixing audio signals fed from other equipment in response to the event data.

12. A control equipment capable of recording and reproducing event data for automated mixing of audio signals, said control equipment belonging to an automix system which is comprised of a plurality of equipments connected to each other through a network, said plurality of equipments including the control equipment and an audio equipment, wherein one of the plurality of the equipments use its own time counter to count time and repeatedly transmit, to the network in a periodic cycle of predetermined intervals, first time information representative of the counted time, and the others of said plurality of equipments each use its own time counter for counting time, receive the first information through the network, and correct the counted time based on the received first time information, thereby synchronizing the time counted by the time counter of the one equipment with the time counted by the time counters of the others of said plurality of equipments, the control equipment comprising:

an extensive time counter that counts overflow of the time counter of the control equipment to provide an extensive time of the control equipment. wherein the time counted by the time counter of the control equipment and the extensive time provided by the extensive time counter of the control equipment constitute an extended time in the control equipment;

a storage section that records a plurality of event data indicative of operations together with time stamps indicating occurrence times of the respective operation indicated by the respective event data;

a reading section that operates based on the extended time for reading out the plurality of event data from the storage section prior to the occurrence times indicated by the time stamps; and a transmitter that transmits the event data read out from the storage section together with the time stamps to the audio equipment via the network, so that the audio equipment receives the event data together with the time stamps, then detects the occurrence times corresponding to the time stamps provided to the respective event data, and executes the operations indicated by the respective event data at the detected occurrence times, wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

13. The control equipment according to claim 12, comprising a sequencer section for feeding audio signals to other equipment.

14. A method of recording event data in an automix system which is comprised of a plurality of equipments connected to each other through a network, said plurality of equipments including an audio equipment and a control equipment capable of recording event data for automated mixing of audio signals. wherein one of said plurality of the equipments use its own time counter to count time and repeatedly transmit, to the network in a periodic cycle of predetermined intervals, first time information representative of the counted time, and the others of said plurality of equipments each use its own time counter for counting time, receive the first time information through the network, and correct the counted time based on the received first time information, thereby synchronizing the time counted by the time counter of the one equipment with the time counted by the time counters of the others of said plurality of equipments the method comprising a transmission process performed at the audio equipment and a reception process performed at the control equipment, wherein the transmission process comprises the steps of:

providing an event data indicative of operation;

counting overflow of the time counter of the audio equipment to provide an extensive time of the audio equipment, wherein the time counted by the time counter of the audio equipment and the extensive time provided by the extensive time counter of the audio equipment constitute an extended time in the audio equipment;

acquiring, from the time counter of the audio equipment and the extensive time counter of the audio equipment, an extended time at which the event data is provided by said operating device; affixing the acquired extended time to the event data as a time stamp; and transmitting the event data together with the time stamp to the control equipment via the network, and wherein the reception process comprises the steps of:

receiving the event data together with the time stamp from the audio equipment via the network;

counting overflow of the time counter of the control equipment to provide an extensive time of the control equipment, wherein the time counted by the time counter of the control equipment and the extensive time provided by the extensive time counter of the control equipment constitute an extended time in the control equipment; and recording the received event data together with the time stamp, and wherein one of the control equipment and the audio equipment transmits, to the network at a specified time, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

15. A method of reproducing event data in an automix system which is comprised of a plurality of equipments connected to each other through a network, said plurality of equipments including an audio equipment and a control equipment capable of reproducing event data for automated mixing of audio signals, wherein one of the plurality of the equipments use its own time counter to count time repeatedly transmit, to the network in a periodic cycle of predetermined intervals, first time information representative of the counted time, and the others of said plurality of equipment each use its own time counter for counting time, receive the first time information through the network, and correct the counted time based on the received first time information, thereby synchronizing the time counted by the time counter of the one equipment with the time counted by the time counters of the others of said plurality of equipments each time counter of each equipment, the method comprising a transmission process performed at the control equipment and a reception process performed at the audio equipment, wherein the transmission process comprises the steps of:

counting overflow of the time counter of the control equipment to provide an extensive time of the control equipment, wherein the time counted by the time counter of the control equipment and the extensive time provided by the extensive time counter of the control equipment constitute an extended time in the control equipment;

recording a plurality of event data indicative of operations in a storage together with time stamps indicating occurrence times of the respective operation indicated by the respective event data;

reading out the plurality of the event data from the storage prior to the occurrence times indicated by the time stamps based on the extended time; and transmitting the event data read out from the storage together with the time stamps to the audio equipment via the network, and wherein the reception process comprises the steps of:

counting overflow of the time counter of the audio equipment to provide an extensive time of the audio equipment, wherein the time counted by the time counter of the audio equipment and the extensive time provided by the extensive time counter of the audio equipment constitute an extended time in the audio equipment;

receiving the event data together with the time stamps from the control equipment via the network;

detecting the occurrence times corresponding to the time stamps provided to the respective event data based on the extended time; and executing the operations indicated by the respective event data at the detected occurrence times, and wherein one of the control equipment and the audio equipment transmits, to the network at a specified timing, second time information indicative of the extended time of the one of the control equipment and the audio equipment, and the other of the control equipment and the audio equipment receives the second time information and, based on the received second time information, synchronizes the extended time of the other of the control equipment and the audio equipment with the extended time of the one of the control equipment and the audio equipment.

16. The automix system according to claim 1, wherein one of the control equipment and the audio equipment transmits the second time information when the recording section of the control equipment starts recording of the event data.

17. The automix system according to claim 1, wherein one of the control equipment and the audio equipment transmits the second time information when the extended time counted in one of the control equipment and the audio equipment reaches a specific time.

18. The automix system according to claim 3, wherein one of the control equipment and the audio equipment transmits the second time information when the recording section of the control equipment starts recording of the event data.

19. The automix system according to claim 3, wherein one of the control equipment and the audio equipment transmits the second time information when the extended time counted in one of the control equipment and the audio equipment reaches a specific time.

* * * * *